United States Patent
Hwang

(10) Patent No.: US 7,302,259 B2
(45) Date of Patent: Nov. 27, 2007

(54) MOBILE STATION AND METHOD FOR SELECTING PUBLIC LAND MOBILE NETWORK THEREBY

(75) Inventor: Sun-Ho Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 203 days.

(21) Appl. No.: 10/758,412

(22) Filed: Jan. 14, 2004

(65) Prior Publication Data

US 2004/0152462 A1    Aug. 5, 2004

(30) Foreign Application Priority Data

Jan. 16, 2003    (KR) ............... 10-2003-0003055

(51) Int. Cl.
*H04Q 7/20*    (2006.01)
(52) U.S. Cl. .............. 455/432.1; 455/435.1; 455/552.1
(58) Field of Classification Search ........... 455/432.1, 455/432.2, 432.3, 435.1, 552.1, 553.1, 416.1, 455/445
See application file for complete search history.

(56) References Cited

U.S. PATENT DOCUMENTS

| | | | |
|---|---|---|---|
| 5,790,952 A | | 8/1998 | Seazholtz et al. |
| 6,138,019 A | * | 10/2000 | Trompower et al. ........ 455/436 |
| 2002/0087674 A1 | | 7/2002 | Guilford et al. |
| 2002/0147012 A1 | | 10/2002 | Leung et al. |
| 2005/0101323 A1 | * | 5/2005 | De Beer ................ 455/435.2 |

* cited by examiner

*Primary Examiner*—Melur Ramakrishnaiah
(74) *Attorney, Agent, or Firm*—The Farrell Law Firm, P.C.

(57) ABSTRACT

A mobile station and a method for selecting a public land mobile network thereby which are capable of reducing roaming time and electric current consumption of a mobile station battery by previously determining whether a public land mobile network corresponding to currently received public land mobile network information can be roamed and selectively registering its location in only a base station with a roaming function according to the determination during international roaming.

9 Claims, 3 Drawing Sheets

US 7,302,259 B2

MOBILE STATION AND METHOD FOR SELECTING PUBLIC LAND MOBILE NETWORK THEREBY

PRIORITY

This application claims priority to an application entitled "MOBILE STATION AND METHOD FOR SELECTING PUBLIC LAND MOBILE NETWORK THEREBY" filed in the Korean Industrial Property Office on Jan. 16, 2003 and assigned Serial No. 2003-3055, the contents of which are hereby incorporated by reference.

BACKGROUND OF THE INVENTION

1. Field of the Invention

The present invention relates to a mobile station and more particularly, the present invention relates to a mobile station and a method for selecting a public land mobile network (referred to as a "PLMN" hereinafter) thereby.

2. Description of the Related Art

FIG. 1 is a block diagram showing a configuration of a cellular communication system. When a mobile station (MS) 1 tries to call another mobile station, a call signal is provided to a mobile switching center (referred to as "MSC" hereinafter) 7 through a base station (BS) 3a and a base station controller (BSC) 5. The BSC 5 controls a plurality of base stations 3a, 3b, . . . 3m. The MSC 7 connects a call of the mobile station 1 to a base station of the another mobile station. The MSC 7 controls the operation of the plurality of base stations, and is connected to a home location register (referred to as "HLR" hereinafter) 9 and an authentication center (AUC) 11. The HLR 9 stores a location of each mobile station. The AUC 11 performs an authentication procedure.

An operation of the cellular communication system will now be explained with reference to FIG. 1. A mobile station 1 searches for the strongest signal among signals which a neighboring base station transmits and accesses the corresponding base station. In such a situation, a subscriber dials a terminating number and simultaneously transmits an International Mobile Subscriber Identity (referred to as "IMSI" hereinafter) number. The MSC 7 performs a subscriber's authentication through the AUC 11. The base station 3a transmits a channel allotment message to the mobile station 1. The mobile station 1 starts calling using the channel allotment message from the base station 3a.

For the calling connection, the MSC 7 causes the base station 3a to transmit a paging signal in order to detect the location of the mobile station 1. Since the mobile station 1 continues to scan for signals of the base station 3a, when a mobile station 1 is called, the mobile station 1 sends the International Mobile Subscriber Identification (IMSI) number and either of a Temporary Mobile Subscriber Identity (TMSI) or an International Mobile Subscriber Identification (IMSI) to the corresponding base station 3a.

When the mobile station 1 has an international roaming function which registers its location in another mobile communication business proprietor base station and receives a communication service therefrom, during international roaming the mobile station 1 acquires synchronization using a frequency having a maximum receiving strength, receives system information provided from neighboring base stations, and extracts PLMN identification information from the received system information. The mobile station 1 registers its location in a base station using the extracted PLMN identification information. The PLMN identification information is information that a wireless terminal device receives from an MSC in order to classify the PLMN wherein the MSC supports a mobile communication network service according to regions. The PLMN identification information includes a Mobile Country Code (MCC), a Mobile Network Code (MNC), and a Location Area Identity (LAI).

When the mobile station travels into an area of another MSC, or a base station which belongs to a system provided by another service business proprietor, the mobile station receives a roaming service which provides a service to mobile stations between different communication business proprietors as a result of agreement between different communication business proprietors. An international roaming function provides such a service to a mobile station traveling into another country, gives an intrinsic number of an international standard to a mobile station, and allows the mobile station to receive a mobile communication service based on the given intrinsic number of an international standard, when the mobile station travels into another country, for bilateral communication between the mobile station and the service business proprietor.

A mobile station subscriber subscribes to a home PLMN, and a corresponding terminal device is used in the registered PLMN. Home PLMN information and registered PLMN information are stored in a User Subscriber Identity Module (referred to "USIM" hereinafter) of a mobile station having the international roaming function. The home PLMN information and the registered PLMN information are also stored in a wireless terminal device which the subscriber uses when the subscriber subscribes to a mobile communication service.

A description will now be given of a PLMN selecting method during international roaming by a mobile station. When power of a mobile station is turned on the mobile station performs a slot synchronization and a frame synchronization using a frequency having a maximum receiving strength in order to acquire system information. Thereafter, the mobile station extracts PLMN information from the acquired system information. The mobile station compares an MCC of the extracted PLMN information with an MCC of a final usage PLMN, and will recognize that an international roaming has occurred when the MCC of the extracted PLMN information is different from the MCC of final usage PLMN information. When the MCC of the extracted PLMN information is identical with the MCC of a final usage PLMN information, the mobile station registers its location in base stations which are located in neighboring cells using the extracted PLMN information.

However, since the conventional mobile station does not have information as to whether a currently received PLMN corresponds to a roaming PLMN, a conventional mobile station registers its location in a current PLMN first in order to select a roaming PLMN. When a base station does not allow the registration of the mobile station, it is judged that a current PLMN is a PLMN to which a mobile station can not roam, and the mobile station performs another registration in a next PLMN. In other words, the mobile station acquires new PLMN information using another frequency and repeats a procedure in which the mobile station sends a request to register its location in a base station using the newly acquired PLMN information. Accordingly, the mobile station acquires PLMN identification information for all sequentially received frequencies until the mobile station acquires a registered PLMN information from a base station, and repeats a registration procedure by using the acquired PLMN information, resulting in a time delay as a necessary consequence. Consequently, the electric current consumption of a mobile station battery increases.

SUMMARY OF THE INVENTION

Accordingly, an object of the present invention is to provide a mobile station and a method for selecting a PLMN thereby which are capable of reducing a roaming time and electric current consumption of a mobile station battery by previously determining whether a PLMN corresponding to currently received PLMN information has a roaming function and selectively registering its location in only a base station with a roaming function according to the determination during an international roaming.

In order to accomplish these and other objects, in accordance with a first aspect of the present invention, there is provided a mobile station for registering its location in a base station based on public land mobile network information included in system information which the base station transmits, the public land mobile network information including country and network identification codes, the mobile station comprising: a memory for storing a roaming public land mobile network table which has home public land mobile network information and information for a public land mobile network of a mobile communication business proprietor which supports a roaming function into the public land mobile network of a mobile communication business proprietor and a home public land mobile network; and a controller for determining whether acquired public land mobile network information exists in the roaming public land mobile network table stored in the memory using a frequency having a maximum receiving strength when international roaming occurs, registering the mobile station in a base station using the acquired public land mobile network information when the acquired public land mobile network information exists in the roaming public land mobile network table, acquiring new public land mobile network information using frequencies having a receiving strength less than the maximum receiving strength when the acquired public land mobile network information does not exist in the roaming public land mobile network table and determining the newly acquired public land mobile network information exists in the roaming public land mobile network table.

In accordance with a second aspect of the present invention, there is provided a method for selecting a public land mobile network of a mobile station in order to register the mobile station in a base station based on public land mobile network information included in system information which the base station transmits, the mobile station including a memory for storing final usage public land mobile network information and home public land mobile network information, the method comprising the steps of: (i) storing a roaming public land mobile network table in the memory, the roaming public land mobile network table including the home public land mobile network information and a plurality of public land mobile network information; (ii) acquiring public land mobile network information using a frequency having a maximum receiving strength when power of the mobile station is turned on; (iii) determining whether international roaming occurs; (iv) determining whether the acquired public land mobile network information exists in the roaming public land mobile network table stored in the memory when the international roaming occurs; and (v) registering the mobile station in the base station when the acquired public land mobile network information exists in the roaming public land mobile network table stored in the memory, acquiring new public land mobile network information using frequencies having receiving strength less than the maximum receiving strength when the acquired public land mobile network information does not exist in the roaming public land mobile network table and comparing the newly acquired public land mobile network information with the roaming public mobile network table.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention unclear.

Figure 1:
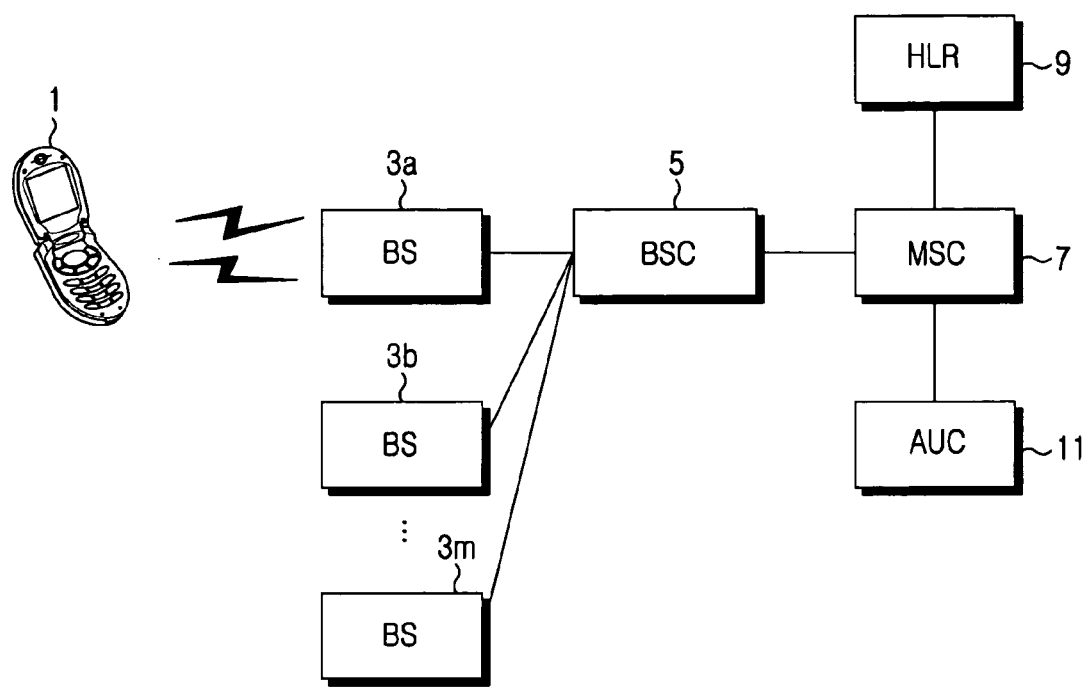
FIG. 1 is a block diagram showing a configuration of a cellular communication system.
Figure 2:
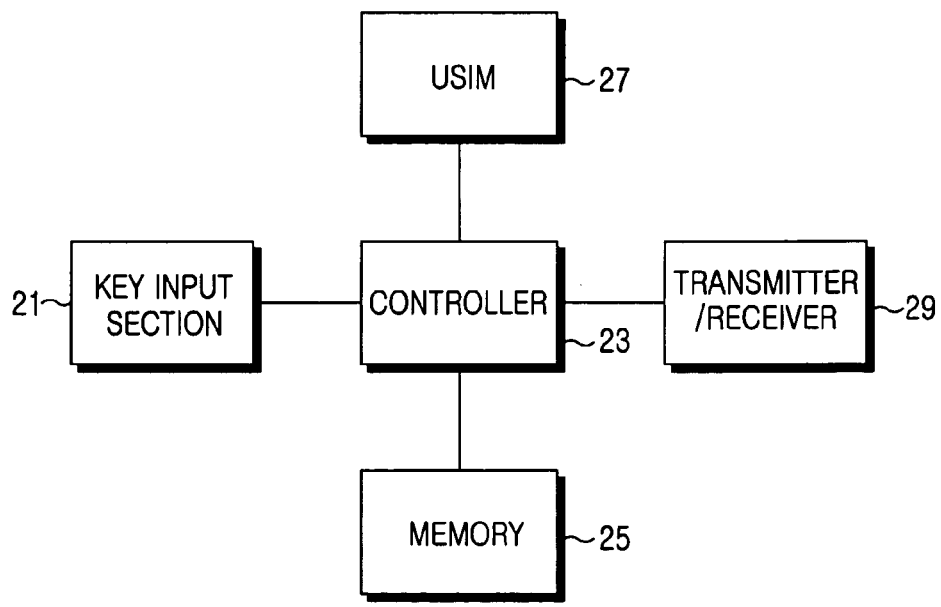
FIG. 2 is a block diagram showing a configuration of a mobile station according to an embodiment of the present invention.

FIG. 2 is a block diagram showing a configuration of a mobile station 1 according to an embodiment of the present invention. As shown in FIG. 2, the mobile station 1 includes a key input section 21, a transmitter/receiver 29, an User Subscriber Identity Module (USIM) 27, a memory 25, and a controller 23. The key input section 21 performs an operation for a user key input. The transmitter/receiver 29 communicates with a plurality of base stations 3a, 3b, . . . 3m. The USIM 27 stores final usage PLMN information and home PLMN information. The memory 25 stores a roaming public land mobile network table which has home public land mobile network information and public land mobile network information of a mobile communication business proprietor which roams into a home public land mobile network.

The controller 23 determines whether or not acquired public land mobile network information exists in the roaming public land mobile network table stored in the memory 25 using a frequency having a maximum receiving strength when international roaming occurs. The controller 23 registers the mobile station in a base station using the acquired public land mobile network information when the acquired public land mobile network information exists in the roaming public land mobile network table. The controller 23 acquires new public land mobile network information using frequencies having receiving strength less than the maximum receiving strength when the acquired public land mobile network information does not exist in the roaming public land mobile network table, and then determines whether or not the newly acquired public land mobile network information exists in the roaming public land mobile network table. The controller 23 extracts public land mobile network information from the acquired system information using the frequency having a maximum receiving strength when power of the mobile station is turned on, and compares a country code of the acquired public land mobile network information with a country code of the final usage public land mobile network information. The controller 23 determines whether an international roaming occurs when the MCC of the acquired public land mobile network information is different from the MCC of the final usage PLMN information. The controller 23 then determines whether or not the acquired PLMN information exists in the roaming PLMN table which is stored in the memory 25. When the acquired PLMN information exists in the roaming PLMN table, the controller 23 registers the mobile station 1 in a base station by using currently acquired PLMN information.

When new roaming information occurs, update information of the roaming PLMN table stored in the memory 25 is provided to the base station 3a. When the mobile station 1 receives an MCC and MNC of new PLMN information through a Short Message System Cell Broadcast (SMS CB), the controller 23 automatically updates the roaming PLMN table or displays it on a display device (not shown) so that a user can operate the key input section 21 to update the roaming PLMN table.

Figures 3, 4:
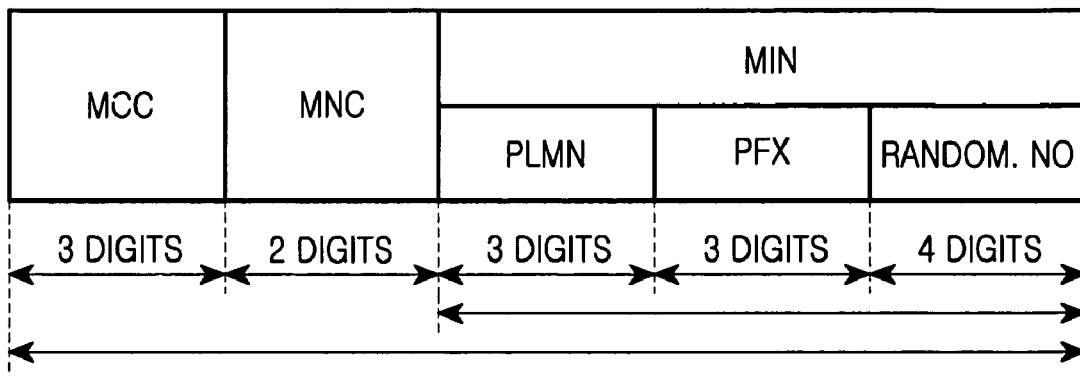
FIG. 3 is a view showing a data structure of an IMSI which the mobile station transmits for a location registration.
FIG. 4 is a view showing a PLMN table having a roaming function according to an embodiment of the present invention.

FIG. 3 is a view showing a data structure of an IMSI which the mobile station 1 transmits for location registration. The mobile station 1 uses a mobile subscriber number system preferably consisting of 15 digits which is referred to as "IMSI" having a number indicating the mobile station in order to register its location in a base station 3a. As shown in FIG. 3, the number system of the IMSI includes a 3 digit MCC, a 2 digit MNC, and a 10 digit MIN. The MCC is one example of a country code, the MNC is one example of a network code, and the MIN is a subscriber identification number. The MIN includes PLMN information which is a subscriber's mobile communication business proprietor number, a PFX (PreFix) which is a country number, and a personal number RANDOM NO.

When power of the mobile station 1 is turned on, the controller 23 selects one of the stored home PLMN information of a corresponding mobile station and a plurality of PLMN information which can be registered based on PLMN information extracted from system information that the base station 3 transmits. The mobile station 1 performs location registration by transmitting the 15 digit IMSI information having the selected PLMN information in order to receive a communication service.

FIG. 4 is a view showing a PLMN table with a roaming function stored in the memory 254 shown in FIG. 2.

Since home PLMN information, an MCC of the home PLMN information, and roaming PLMN information in the roaming PLMN table vary according to a user of a mobile station, who uses a base station of any country as a home PLMN, the roaming PLMN information is preferably tabled according to MCCs of the home PLMN. In this case, the PLMN table with a roaming function includes MCCs of a plurality of home PLMNs and a plurality of roaming PLMN information for the MCCs. At this time, referring to FIG. 3, the controller 23 reads home PLMN information from the USIM 27 and determines whether a current PLMN service of a plurality of PLMNs forming the PLMN table with a roaming function is one of a plurality of PLMNs which roam into the home PLMN. For example, when an MCC of a home PLMN in the mobile station 1 is "001", the controller 23 sequentially compares currently received PLMN information with "002 01, 003 02, 004 02, 005 04" which roam with the MCC "001" of a home PLMN based on the read home PLMN information and roaming PLMN table during international roaming. The controller 23 also determines whether or not the currently received PLMN information corresponds to one of "002 01, 003 02, 004 02, 005 04" according to the comparison result. During international roaming of the mobile station 1, the controller 23 determines whether or not the currently received PLMN information exists in the roaming PLMN table based on the roaming PLMN table formed according to an agreement between a home mobile communication business proprietor and a mobile communication business proprietor of another country. When the currently received PLMN information exists in the roaming PLMN table, the controller 23 registers a location of the mobile station 1 in a base station by using the currently received PLMN information. When the currently received PLMN information does not exist in the roaming PLMN table, the controller 23 performs a synchronization using a frequency having a signal strength less than a maximum receiving strength. Thereafter, the controller 23 acquires new PLMN identification information and compares the newly acquired PLMN identification information with information in the roaming PLMN table.

Figure 5:
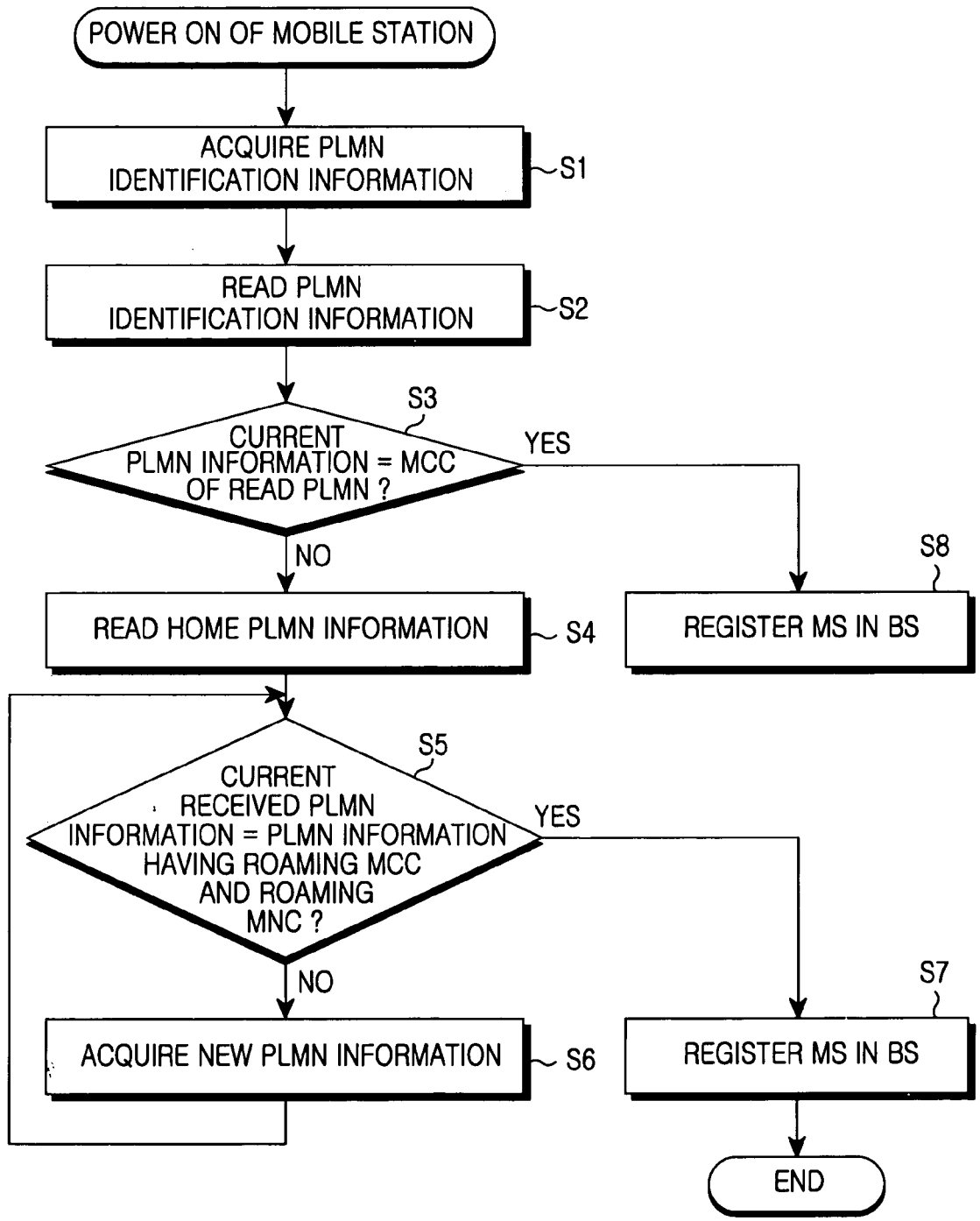
FIG. 5 is a flow chart which illustrates a method for selecting a PLMN of a mobile station during roaming according to an embodiment of the present invention.

Hereinafter, a method for selecting a PLMN of a mobile station during roaming according to an embodiment of the present invention will be described with reference to the flowchart of FIG. 5.

The controller 23 stores a roaming public land mobile network table in the memory 25. The roaming public land mobile network table includes home PLMN information and a plurality of PLMN information. When power of the mobile station is turned on, the controller 23 performs a synchronization procedure using a frequency having a maximum receiving strength to acquire system information which a base station 3 transmits, and acquires identification information of a PLMN service from the acquired system information in step S1. In step S2, the controller 23 reads identification information of a PLMN service which is finally used in the USIM 27 from the USIM 27. In step S3, the controller 23 determines whether or not current PLMN information extracted from the system information is identical with an MCC of the PLMN information which is finally used. As a result of the determination in step S3, when the current PLMN information extracted from the system information is different from the MCC of the PLMN information, the controller 23 determines that an international roaming occurs and reads home PLMN information from the USIM 27 in step S4. When the current PLMN information extracted from the system information is identical with the MCC of the PLMN service, the controller 23 registers the location of the mobile station in the base station 3 using final registered usage PLMN information in step 8.

In step S5, the controller 23 determines whether or not currently received PLMN information corresponds to PLMN information having a roaming MCC and a roaming MNC based on the read home PLMN information and the roaming PLMN table which is stored in the memory 25. As a result of the determination in step S5, when the currently received PLMN information corresponds to the information having the home PLMN information, a roaming MCC, and a roaming MNC, then the controller 23 registers a location of the mobile station in the base station 3 using the acquired PLMN information in step S7. When it is determined in step S5 that the currently received PLMN information does not correspond to the information having the home PLMN information, the roaming MCC, and the roaming MNC, the controller 23 acquires new PLMN information using a frequency having a receiving strength less than the maximum receiving strength in step S6, and the routine returns to step S5.

Therefore, the controller previously stores in table form a plurality of PLMN information for a mobile communication business proprietor of another country which has an international roaming agreement with a home business proprietor of the mobile station 1. In order to perform international roaming, the mobile station quickly determines whether or not currently received PLMN information is information for a roaming region. The mobile station registers its location in a base station or acquires next PLMN according the determination. As a result, since a frequency searching procedure necessary to register acquired PLMN information in the base station is omitted, PLMN selecting time is reduced, and accordingly, power consumption is reduced, to extend usage time of a mobile station battery. The mobile station quickly selects a roaming PLMN and registers its location in a mobile communication business proprietor base station of another country.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile station for registering its location in a base station based on public land mobile network information included in system information which the base station transmits, the public land mobile network information including country and network identification codes, the mobile station comprising:
   a memory for storing a roaming public land mobile network table which has home public land mobile network information and information for a public land mobile network of a mobile communication business proprietor which supports a roaming function into the public land mobile network of a mobile communication business proprietor and a home public land mobile network; and
   a controller for determining whether acquired public land mobile network information exists in the roaming public land mobile network table stored in the memory using a frequency having a maximum receiving strength when international roaming occurs, registering the mobile station in a base station using the acquired public land mobile network information when the acquired public land mobile network information exists in the roaming public land mobile network table, acquiring new public land mobile network information using frequencies having a receiving strength less than the maximum receiving strength when the acquired public land mobile network information does not exist in the roaming public land mobile network table and determining whether the newly acquired public land mobile network information exists in the roaming public land mobile network table wherein roaming time is reduced by selectively registering a Public Land Mobile Network (PLMN) location only in a base station with a roaming function.

2. The mobile station as recited in claim 1, wherein the memory stores final usage public land mobile network information; and
   the controller extracts public land mobile network information from the acquired system information using the frequency having a maximum receiving strength when power of the mobile station is turned on, compares a country code of the extracted public land mobile network information with a country code of the final usage public land mobile network information, and determines that international roaming occurs when the country code of the extracted public land mobile network information is different from the country code of the final usage public land mobile network information.

3. The mobile station as recited in claim 1, wherein the roaming public land mobile network table is obtained by tabling public land mobile network information for a roaming mobile communication business proprietor with respect to a plurality of home public land mobile network information; and
   when determining whether the acquired public land mobile network information exists in the roaming public land mobile network table, the controller reads the home public land mobile network information from the memory, and compares the read home public land mobile network information with roaming public land mobile network information corresponding to the home public land mobile network information.

4. The mobile station as recited in claim 2, wherein the controller registers the mobile station in a final usage public land mobile network when the country code of the extracted public land mobile network information is identical with the country code of the final usage public land mobile network information.

5. The mobile station as recited in claim 1, wherein the base station transmits the home public land mobile network information and the roaming public land mobile network information to the mobile station by a short service cell broadcast; and
   the controller updates the roaming public land mobile network table stored in the memory based on the short service cell broadcast provided from a base station of one of the home mobile communication business proprietor and another mobile communication business proprietor.

6. A method for selecting a public land mobile network of a mobile station in order to register the mobile station in a base station based on public land mobile network information included in system information which the base station transmits, the mobile station including a memory for storing final usage public land mobile network information and home public land mobile network information, the method comprising the steps of:
   (i) storing a roaming public land mobile network table in the memory, the roaming public land mobile network table including the home public land mobile network information and a plurality of public land mobile network information;
   (ii) acquiring public land mobile network information using a frequency having a maximum receiving strength when power of the mobile station is turned on;
   (iii) determining whether international roaming occurs;
   (iv) determining whether the acquired public land mobile network information exists in the roaming public land mobile network table stored in the memory when the international roaming occurs; and
   (v) registering the mobile station in the base station when the acquired public land mobile network information exists in the roaming public land mobile network table stored in the memory, acquiring new public land mobile network information using frequencies having receiving strength less than the maximum receiving strength when the acquired public land mobile network information does not exist in the roaming public land mobile network table and comparing the newly acquired public land mobile network information with the roaming public mobile network table wherein roaming time is reduced by selectively registering a Public Land Mobile Network (PLMN) location only in a base station with a roaming function.

7. The method as recited in claim 6, wherein step (iii) includes the step of comparing the acquired public land mobile network information with a country code of a final usage public land mobile network information.

8. The method as recited in claim 6, wherein the roaming public land mobile network table is obtained by tabling public land mobile network information for a mobile communication business proprietor which supports a roaming function with respect to a plurality of home public land mobile network information; and the method further comprising the step of:

reading the home public land mobile network information from the memory; and comparing, at step (iv), the acquired public land mobile network information with roaming public land mobile network information corresponding to the read home public land mobile network information.

9. The method as recited in claim 6, further comprising the steps of:

(vi) receiving new public land mobile network information from the base station through a short service cell broadcast; and (vii) updating the roaming public land mobile network table by adding the received new public land mobile network information to the roaming public land mobile network table.

* * * * *